Patented Aug. 1, 1939

2,168,064

UNITED STATES PATENT OFFICE

2,168,064

INSECTICIDE

Dalton B. Faloon, Beacon, N. Y., assignor to Hammond Paint & Chemical Co., Inc., Beacon, N. Y., a corporation of New York No Drawing. Application June 11, 1935, Serial No. 26,072

12 Claims. (Cl. 167—24)

This invention relates to insecticides and more particularly to organic insecticidal dusts.

The loss of toxic principles in insecticides such as those containing, as the active agent, ground rotenone-bearing root and powdered pyrethrum can be traced to detrimental chemical and physical changes caused by oxidation and the chemical action of the ultra violet rays of the sun, and these rays are particularly active in the presence of moisture.

It has been proposed to employ carbon black and other light-absorbent materials for the purpose of absorbing the sun's rays, but these materials tend to intensify the temperature of the insecticide and the increase in temperature promotes chemical and physical activity to such a degree that the toxic qualities of the insecticide are quickly dissipated.

The principal object of the present invention is to provide an insecticide having light-reflecting qualities, whereby the sun's rays will be reflected from the insecticide and thus the life of the toxic principles of the insecticide will be materially prolonged.

Another object of the invention is to provide an organic insecticidal dust which possesses light-reflecting qualities together with plant growth stimulating qualities.

Still another object is to provide such an insecticide which tends to inhibit fungi and bacterial growths.

Another object is to provide an insecticide which will not tend to absorb moisture to a degree detrimental to the toxic principles of the insecticide and at the same time will reflect the rays of the sun.

Other objects and advantages of this invention will be apparent during the course of the following detailed description.

Organic insecticides are those containing an organic substance as a toxic agent and such an agent may be found in plant substance, such as rotenone-bearing roots, i. e., derris, cube and barbasco, for instance, and in the flower heads and associated structure of certain of the pyrethrums.

The light-reflecting substances having, in addition, other qualities which have been discovered as making them particularly applicable as an ingredient of commercial insecticides are, preferably, titanium-containing compounds such as titanium oxide, calcium titanox, barium titanox and titanated lithopones, antimony oxide, lithopone-zinc sulphide, zinc oxide, highly calcined gypsum and barium sulphate.

The titanium oxide used as the light reflecting substance, in the improved composition of matter, is the dioxide ($TiO_2$). These terms are viewed as synonymous in the chemical and the practical arts to which this invention relates, since titanium dioxide is accepted as the most common and the most stable form of titanium.

These light-reflecting substances are in no sense inert materials for I have discovered that in the proportions employed they have plant-growth stimulating qualities, yet they inhibit the growth of fungi and bacteria.

Ordinarily, an inert carrier is employed in the novel insecticide, and may be any one, or a combination of them, of the well known approved carriers, such as kaolin, talc and the like.

In this specification percentages will be given in the several formulae as by weight.

Typical formulae for the novel insecticides are:—

Formula A

| | Per cent |
|---|---|
| 5% rotenone-bearing root (ground) | 15 |
| Or pyrethrum powder | 25 |
| Titanium oxide base pigment | 12 |
| Kaolin or other inert material | 63 to 73 |

Titanium oxide base pigment consists primarily of titanium oxide in combination with barium sulphate or a calcium base and, while the above percentage of this substance is preferred, the percentage may vary within reasonable limits. For instance, the titanium oxide base pigment may be increased to 20% with a proportional reduction in the percentage of inert carriers. In the place of the titanium oxide base pigment, titanium oxide alone may be employed, or there may be a mixture of the base pigment and the oxide.

Insecticides made up according to formula A were employed in both infested cabbage and bean fields during extremely hot weather, when conditions were proper for a sun test, for rains were not in evidence, and a proper check made, i. e., one long row (#1) of vegetables was left untreated, the next row (#2) was treated with an insecticide made up of 15% of toxic agent and the balance inert material, a third row (#3) similar to the first, and the fourth row (#4) treated with the novel dust. The method of checking results was to determine the number of beetles or cabbage worms on the rows to be tested, the relative number of insects, larvae, etc., on the rows not to be treated and then to check daily on the number of specimens on each of the rows, to determine just what effect the several insecticides might be exerting on the control of the insects. By following this procedure, it was possible to determine the time at which the dust on the row #2 lost its power to control insects and also to determine just the end limit of the dust treated to reflect light and, consequently, be protected from the detrimental effects of the sunlight. In the case of the titanium compounds when used in both the pyrethrum and the rotenone dusts, it was found that this form of treatment made the pyrethrum and the rotenone dusts exert a toxic effect on both the cabbage worm and the bean beetle for a period of 65% longer than the active life of untreated dusts.

*Formula B*

| | Per cent |
|---|---|
| 5% rotenone-bearing root (ground) | 15 |
| Or pyrethrum powder | 25 |
| Antimony oxide | 12 |
| Kaolin or other inert material | 63 to 73 |

Tests made with this insecticidal composition, compounded according to formula B, and employed as set out under formula A, showed that the novel insecticide had toxic effect for a period of time 85% greater than that of the conventional mixtures not containing antimony oxide and, during these last tests, there was a normal rainfall.

*Formula C*

| | Per cent |
|---|---|
| 5% rotenone-bearing root (ground) | 15 |
| Or pyrethrum powder | 25 |
| Lithopone-zinc sulphide pigment | 15 |
| Kaolin or other inert carrier | 60 to 70 |

In place of the lithopone-zinc sulphide pigment, zinc oxide may be employed, or a mixture of 5% zinc oxide and 10% zinc sulphide.

Tests, substantially as heretofore set forth, showed that this addition of lithopone-zinc sulphide pigment increased the life of the toxic effect of the active agent substantially 85% on bean plants and somewhat less on cabbage plants. A mixture of substantially 5% zinc oxide and 10% zinc sulphide employed in the novel insecticide gave results 68% better for the the rotenone and 55% better for the pyrethrum than when ordinary organic insecticides containing the same proportion of rotenone and pyrethrum were employed.

*Formula D*

| | Per cent |
|---|---|
| 5% rotenone-bearing root (ground) | 15 |
| Or pyrethrum powder | 25 |
| Barium sulphate | 75 to 85 |
| Or substantially pure white highly calcined gypsum | 75 to 85 |

This insecticide, which it will be noted does not carry an inert material, was found to give 50% better results, as to time, than a mixture of the identical formula and composition, except the check controlled dust was mixed with a small amount of iron oxide and carbon black to bring its color to that of kaolin dust and to, therefore, have the same light absorption power as kaolin mixtures. Thus, it would appear that the ordinary inert materials employed in insecticides should not be regarded as light-reflecting to a degree making their use equivalent to or even approaching being equivalent to the light-reflecting substances mentioned, simply because they may be light colored.

While the weight of rotenone-bearing root or pyrethrum powder given in the several formulae is substantially the standard weight for an insecticide, the weight of either may be increased or decreased somewhat, with a proportionate increase or decrease in the weight of light-reflecting substances.

As for the effect on plant growth of the critical percentages of light-reflecting substances mentioned, it was discovered that the insecticide prepared according to the several formulae stimulated the plants so that they had stronger and greater growth in the toxic-effect tests described. This was particularly pronounced in the case of the insecticide prepared in accordance with formula B. Even antimony oxide, in the proportions used, was found stimulating to plant growth. This may be due, in part, to some effect of the organic insecticide itself upon the light-reflecting substances named.

Particularly in the case of titanium, zinc and antimony, fungoid and bacterial growths are inhibited and the plants and adjacent soil are sterilized, when the salts and oxides of these metals are employed as herein set out.

In the preparation of the novel insecticide disclosed, the preferred process of manufacture comprises, after the initial preparation of the plant substance, as by finely grinding the rotenone-bearing root or powdering the pyrethrum flowers, in tumbling the plant substances and the light-reflecting composition or compositions in a suitable tumbler until the plant substances have been thoroughly coated by the light-reflecting composition or compositions. For example, substantially 20 pounds plant substances and 16 pounds light-reflecting compounds may be tumbled for substantially fifteen minutes in a tumbler equipped with agitating blades and the inert carrier then added and mixed therewith in any suitable way. If found desirable other ingredients, such as stabilizing chemicals, may be added and the powder is then packaged.

Various changes may be made to the formulae or to the process for the manufacture of the novel insecticide, without departing from the spirit of the invention or the scope of the claims.

I claim:

1. An insecticidal compound comprising substantially 15% to 25% plant substance containing an insecticidal agent which normally loses its toxic principles when exposed to the sun's rays, from 12% to 20% light-reflecting composition of matter, said composition of matter being substantially white and being an oxide of a metal which, in the proportion set out, has a stimulating effect on plant growth, and the balance a carrier therefor, said percentages being by weight.

2. An insecticidal dust comprising substantially 15% ground rotenone-bearing root containing substantially 5% active insecticidal agent, a light-reflecting composition of matter consisting of substantially 12% titanium oxide base pigment, and a carrier therefor, said percentages being by weight.

3. An insecticidal dust comprising substantially 25% pyrethrum powder, a light-reflecting composition of matter consisting of substantially 12% titanium oxide base pigment, and a carrier therefor, said percentages being by weight.

4. An insecticidal composition including a mixture of an insecticide derived from the plant class containing an insecticide which normally loses its toxic principles when exposed to the sun's rays, said class including pyrethrum and rotenone-bearing plants, and a light-reflecting water-insoluble white pigment, said pigment comprising at least 12% by weight of the whole weight of said insecticidal composition, and having stimulating effects on plant growth in the percentage by weight employed.

5. An insecticidal composition consisting of a mixture of a plant substance containing an insecticidal agent which normally loses its toxic principles when exposed to the sun's rays, from 12% to 20% by weight of the entire weight of said insecticidal compound of a light-reflecting water-insoluble white pigment, said pigment in said range of percentages, having a stimulating effect on plant growth, and the balance a carrier.

6. An insecticidal composition consisting of a mixture of a plant substance containing an insecticidal agent which normally loses its toxic principles when exposed to the sun's rays, from 12% to 20% by weight of the entire weight of said insecticidal composition of a light-reflecting water-insoluble white pigment, said pigment being a titanium compound and, in said range of percentages, having a stimulating effect on plant growth, and the balance a carrier.

7. An insecticidal composition consisting of a mixture of a plant substance containing an insecticidal agent which normally loses its toxic principles when exposed to the rays of the sun, said plant substance comprising between 15% and 25% by weight of the entire weight of said insecticidal compound, a light-reflecting water-insoluble white pigment, said pigment being titanium oxide and comprising between 12% and 20% by weight of the entire weight of said insecticidal composition, and the balance by weight being a carrier.

8. An insecticidal composition comprising a powdered insecticide of plant origin, which normally loses its toxic principles when exposed to the sun's rays, coated with a white pigment in sufficient quantity to inhibit the loss of the toxic principles of said insecticide when exposed to light.

9. An insecticidal composition comprising a powdered insecticide of plant origin, which normally loses its toxic principles when exposed to the sun's rays, coated with titanium dioxide in sufficient quantity to inhibit the loss of the toxic principles of said insecticide when exposed to light.

10. An insecticidal composition comprising a powdered insecticide of plant origin, which normally loses its toxic principles when exposed to the sun's rays, coated with zinc oxide in sufficient quantity to inhibit the loss of the toxic principles of said insecticide when exposed to light.

11. An insecticidal composition comprising a comminuted insecticide of plant origin, which normally loses its toxic principles when exposed to the sun's rays, having mixed in a protecting relation therewith a titanated lithopone suitable and in sufficient quantity to inhibit the loss of the toxic principles of said insecticide when exposed to light.

12. An insecticidal composition having as principal toxic ingredients powdered organic plant material from a group consisting of derris, cube or pyrethrum coated with a light reflecting pigment in sufficient quantity to inhibit the loss of toxic principles of said insecticide when exposed to light, such pigment being selected from a group consisting of titanium oxide, titanated lithopone, and zinc oxide.

DALTON B. FALOON.